Feb. 13, 1968     B. S. DEW     3,368,410
GYRO FAST SLEW MODIFICATION
Filed Nov. 22, 1965     2 Sheets-Sheet 1
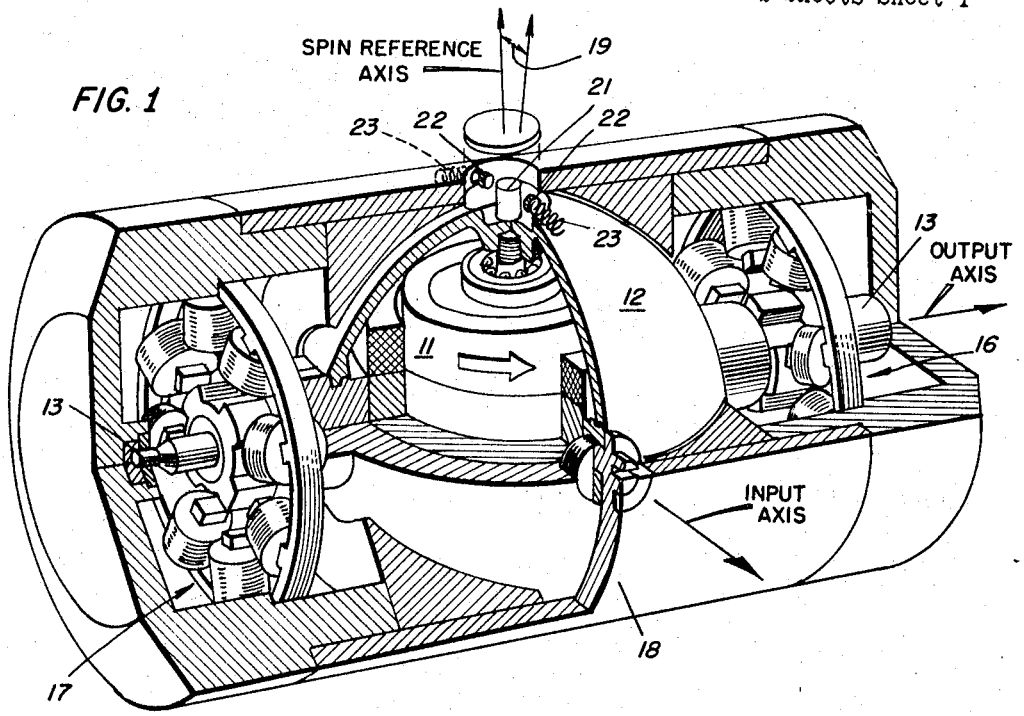
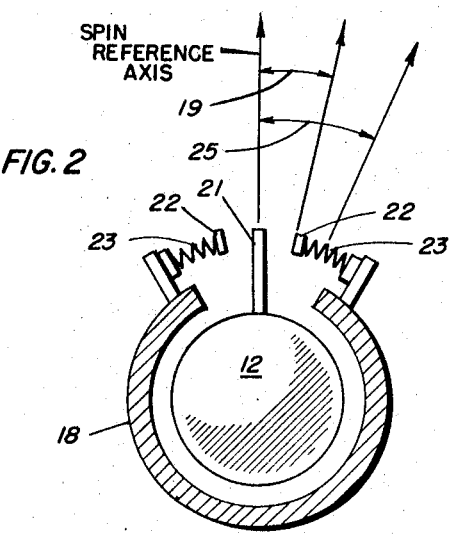
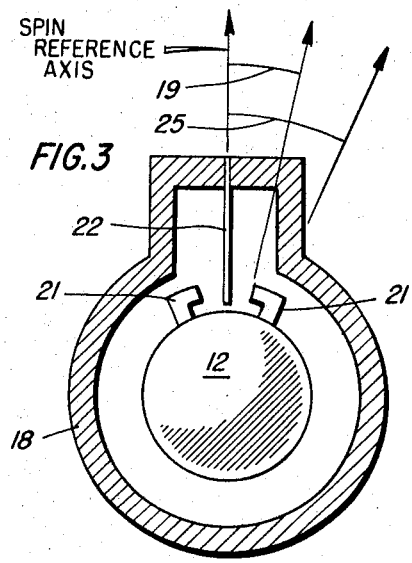
INVENTOR
BROCK S. DEW
BY
ATTORNEY
AGENT

United States Patent Office 3,368,410
Patented Feb. 13, 1968

3,368,410
GYRO FAST SLEW MODIFICATION
Brock S. Dew, Brighton, Mass., assignor, by mesne assignments, to the United States of America as represented by the Secretary of the Navy
Filed Nov. 22, 1965, Ser. No. 509,692
3 Claims. (Cl. 74—5)

ABSTRACT OF THE DISCLOSURE

This disclosure is directed to an integrating gyroscope. In this gyroscope a signal generator is connected to detect the rotation of the gyroscope gimbal about the output axis. The output of the signal generator is fed to a summing amplifier where it is added to the output of an error signal generator. The output of the summing amplifier is fed to the torque motor which is connected to reposition the gyroscope and spring stops are provided to restrict the motion of the gimbal. The gyroscope is operative upon receipt of an output from the summing amplifier, indicative of the presence of an error signal, to cause the gimbal to rotate into the range of the spring stops to thereby impart added torque to the gimbal and increase the slewing rate of the gimbal and enable the gyroscope to be more rapidly repositioned through large angles.

---

The present invention relates generally to gyroscopic devices and more specifically to gyroscopically stabilized platforms.

The gyroscopic means used on the stabilized platforms of inertially guided aircraft and missiles may be of a variety of forms. One type of means widely used at the present time is the floated integrating gyroscope, which comprises a rotor member mounted for rotation about a spin reference axis, in a gimbal which in turn is mounted in a casing for rotation about an output axis, which is generally perpendicular to the spin reference axis. The gimbal is buoyed up by a viscous fluid in substantial neutral suspension so that there is little direct loading on the bearings which define the output axis. Each gyroscope has an input axis which is perpendicular to both the output axis and the spin reference axis. The floated gyroscopes usually include means for sensing any rotation of the gimbal about the output axis and for producing a signal proportional to the rotation. The floated gyros also usually include means for applying torques to the gimbal about the output axis for the purpose of tending to rotate the gimbal assembly relative to the outer case or housing about the output axis.

The torque generators of inertial quality gyros are usually designed for the load torquing rates that are used in normal operation. It is often desirable, however, to slew the gyro at a high rate in order to reposition it rapidly. To design the torque generator large enough to accomplish this would compromise its accuracy. By this invention the rigid mechanical stops which engage the gyro float to limit rotational movement are replaced by spring loaded ones. The design of these stops is such that they function as the old did under normal operation, but can be overridden when a high rate of slew is desired. Therefore, to slew the gyro rapidly it is necessary only to insert a false error signal to the gyro-servo loop, forcing the gyro float to rotate into the spring range of the stops and thus applying a large torque rate. Therefore, the torque generator design need not be compromised and the large torque source is completely decoupled from the gyro during normal operation.

It is an object of the present invention to provide an improved gyroscopic apparatus for stabilizing a device such as an aircraft inertial guidance system platform.

A further object of the present invention is to provide an improved integrating gyroscopic device in which the spin reference axis may be quickly reoriented.

Other objects, advantages and novel features of the present invention will become apparent from the following detailed description of the invention when considered in conjunction with the accompanying drawings wherein:

FIG. 1 is a pictorial view in diagrammatic form of a floated integrating gyro;

FIG. 2 is a diagrammatic view illustrating the relationship of elements on a transverse plane through the center of the gyro float; and FIG. 3 is a diagrammatic view of an alternative embodiment of the invention.

Figure 4:
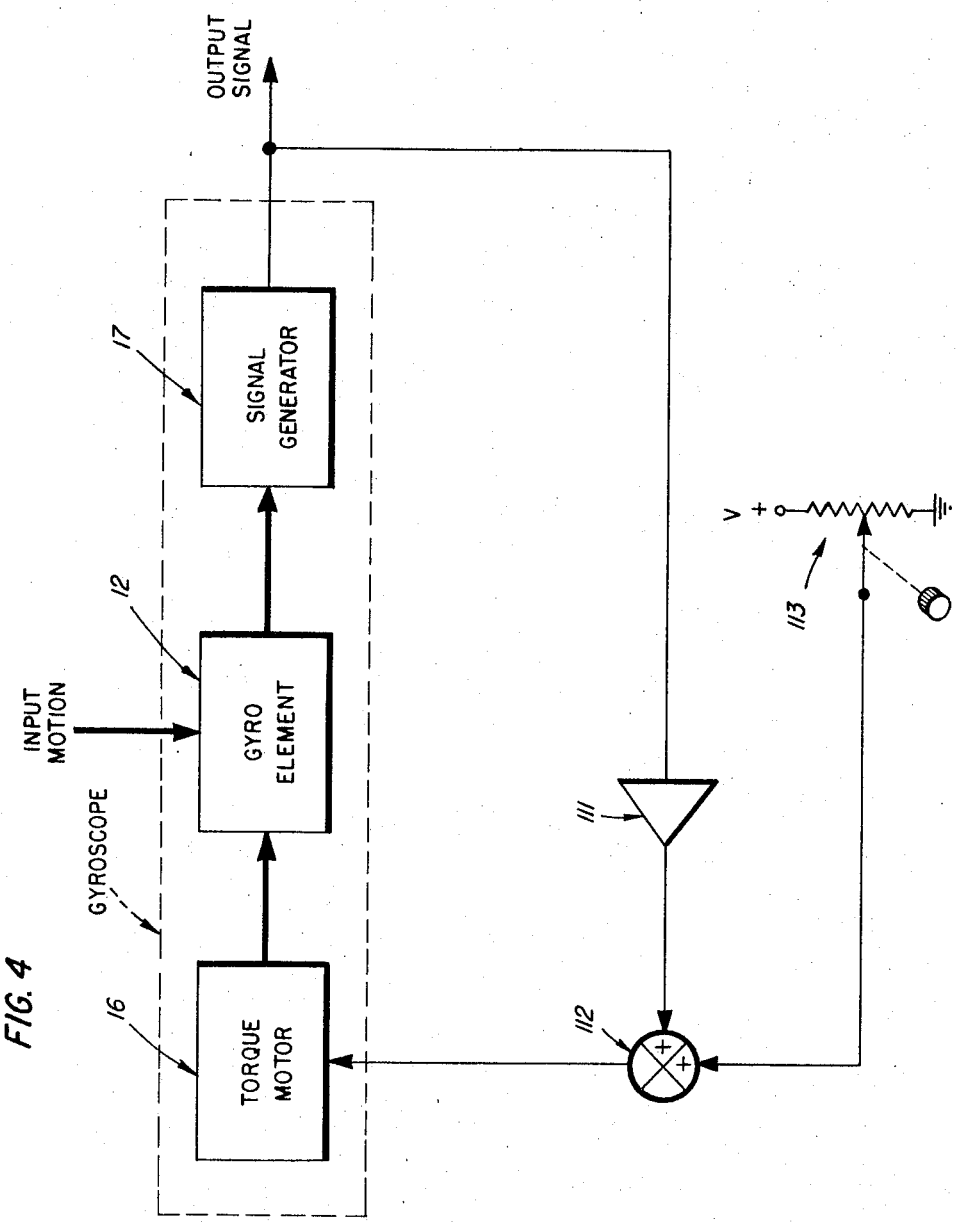
FIG. 4 is a schematic diagram showing the control circuit of the invention.

Referring to FIG. 1 well-known design of floated integrating gyroscope is indicated generally at 10. It comprises an electrically driven gyroscopic rotor 11 mounted for rotation about its axis of rotation and within a spherical float assembly 12. The float assembly 12 is in turn mounted about an axis disposed at 90° to that of the gyroscope rotor and on bearings and pivots at 13. Mounted concentrically about the float assembly axis is a torque generator 16, which can drive the float assembly angularly, and a signal generator 17 which picks off electrically a signal indicative of any movement of the float assembly about its mounting axis in order to sense deviations of the platform, not shown, which the gyro is stabilizing on a predetermined reference plane.

The entire mechanism described above is mounted in a case 18. Movement of an object being stabilized is manifested by a slight angular movement 19 of the case 18, to which it is attached, and about the stabilized gyro float. It is the measurement of this small degree of movement, a function of rotation of the case, which is picked off by the signal generator, and applied as a correction input to the entire inertial system which responds thereto, in a manner to keep the case and attached platform, stabilized. This is accomplished in well-known manner by applying corrective signals from the signal generating means 17 through amplifiers and servo motors, as shown in FIG. 4, which servo motors drive the case and the attached platform back to its original position. The overall basic design of the integrating gyro, as well as its connection and interaction with the platform it is stabilizing, the amplifiers, feedback system, and servo motors and controls form no part of the present invention.

As shown schematically in FIG. 2, by application of the present invention, the float 12 of the gyroscope is provided with a follower 21 which co-acts with stops 22 to limit the angular movement of the float and thus control the rate of application of torque to the system. Stops 22 are mounted on springs 23 and are placed so that the torques placed into the system by the normal corrections necessary during the flight of the aircraft or missile cause the angular motion from the spin reference axis to be less than angle 19. However, under other circumstances, when it is desired to slew the gyro to a new spin reference axis quickly, a large false error signal is added to the signal generator signal which causes the entire inertial system to drive follower 21 into the spring range in order to keep the sum of the false error signal and the signal generator signal at or near zero. As can be seen in FIG. 4, the error signal voltage is derived from potentiometer 113 and is fed to summing amplifier 112 where it is combined with the output of the signal generator 17 through amplifier 111 to control the torque motor 16. The resulting spring torque causes the entire inertial system to move at an angular rate proportional to the spring torque.

In FIG. 3 an alternative embodiment of the invention is shown. Herein the follower element 21 cooperates with a single center-mounted leaf spring 22 to provide the same restraint of float movement found in the embodiment shown in FIG. 2.

The normal operation of this gyroscopic unit is conventional and is well-known in the art. As its input the gyroscopic element is capable of receiving the angular velocity of the case about the input axis. The input axis is at right angles to the output axis. The axis through the pivots 13 is at right angles to the spin reference axis of the rotor 11 when this axis is in its reference position. The output from the gyroscopic element is a torque proportional to the input angular velocity applied to the float assembly 12. This assembly acts as the torque summing member for torque components applied about the output axis. If the gyro element output is the only torque applied to the torque summing member, this torque is completely balanced by the viscous shear torque resulting from the angular velocity of the float cylinder 12 relative to the case 18. Ideally this resisting torque is proportional to the angular velocity. In this way, the balance between gyro unit output torque and viscous shear torque causes the angular velocity of the float with respect to the case to be proportional to the angular velocity of the case with respect to inertial space about the input axis. Angular displacements of the gyro gimbal with respect to the case are indicative of the essential information of the integrated angular velocity of the gyro unit about its input axis. The essential function of the signal generator 17 is to receive angular displacements of the rotor from a reference position fixed with respect to the stator and to produce an output voltage whose magnitude is proportional to the magnitude of the rotor displacement and whose phase indicates the direction of movements. This output voltage signal represents the angular deviation of the gyro unit case from a reference direction in inertial space. To complete a unit able to receive not only angular deviations but also orientation controlled input signals, a torque generator 16 is added to the operating components already described. The rotor of this unit is rigidly attached to the shaft of the float assembly and the stator is fixed in the case. When input currents are supplied, the torque generator 16 applies a torque to the float assembly 12. This torque has an effect equivalent to that of the torque from the gyroscopic element due to an angular velocity of the case about its input axis. With no case angular velocity present, the output from the torque generator causes the float assembly to rotate at a rate proportional to the torque generator output. Because of this action the torque generator input can be used as the positional control command signal to the integrating gyro unit. Over a time interval such an input has an effect on the output equivalent to an angular displacement of the case about the input axis. In normal operation the angular movement of the case 18 with respect to the reference axis of float assembly 12 is limited by contact of follower 21 with stops 22.

As aforestated, any command signal put in by the torque generators would also be limited by the action of follower 21 against stops 22. This limit of movement in rotation is also a limit in the rate of torque and thus the rate at which the platform would be reoriented. If, however, it is desired to quickly reorient the platform axis over a large angle of movement, a slew signal may be given to the torque generator. This signal, when added to the signal generator signal, is strong enough to override springs 23 and imparts to the float a degree of angular movement as great as angle 25, thus providing a higher torque and subsequently a greater rate of movement of the case and platform to the new reference axis.

Thus, it is seen that by the present invention a new and simple means for slewing an inertial guidance system is provided. By the present invention, no additional torque motors are necessary and thus there are fewer places at which the accuracy of the system can be compromised. Furthermore, this high torquing rate system is completely disconnected from the gyro when it is not in use and no complicated stops or rate control means attached to the gyro float are necessary.

Obviously many modifications and variations of the present invention are possible in the light of the above teachings. It is therefore to be understood that within the scope of the appended claims the invention may be practiced otherwise than as specifically described.

What is claimed is:
1. A gyroscopic apparatus comprising:
a gyroscope rotor;
a casing rotatably supporting the rotor;
means for causing the rotor to spin in the casing;
two outer members supporting the casing and rotatable with a single degree of freedom about an output axis perpendicular to the spin axis of the rotor;
a housing rotatably supporting the outer members;
arm means mounted on the casing;
a resilient means mounted on the housing and adjacent to the arm device;
a gyroscopic signal generator coupled to the frame and connected to produce an output signal voltage proportional to the deflection of the casing about the frame;
an error signal generator;
a summing amplifier connected to receive the output of the error signal generator and the output of the gyroscopic signal generator in an additive relation;
an electric torque motor coupled to the frame and connected to receive the output of the summing amplifier and operable upon receipt of a signal from the summing amplifier indicative of the presence of an error voltage to cause the outer members to rotate the casing and bring the arm device into contact with the resilient spring means.
2. The gyroscopic apparatus of claim 1 wherein the resilient means comprises
a set of juxtaposed springs.
3. The gyroscopic apparatus of claim 1 wherein the arm means comprises
a set of juxtaposed stops.

References Cited
UNITED STATES PATENTS

| | | | |
|---|---|---|---|
| 2,504,170 | 4/1950 | Wong | 74—5.4 |
| 2,561,367 | 7/1951 | Haskins | 74—5.4 |
| 2,934,961 | 5/1960 | Katz | 74—5.4 |
| 3,192,778 | 7/1965 | Ephgrave | 74—5 X |

FOREIGN PATENTS

| | | |
|---|---|---|
| 924,968 | 5/1963 | Great Britain. |

FRED C. MATTERN, JR., *Primary Examiner.*

C. J. HUSAR, *Examiner.*